(12) United States Patent
Kamps et al.

(10) Patent No.: US 8,286,781 B2
(45) Date of Patent: Oct. 16, 2012

(54) DEVICE FOR SEPARATING PRODUCT GROUPS

(75) Inventors: Sebastian Kamps, Kleve (DE);
Hans-Gerd Ripkens, Goch (DE);
Thomas Rütten, Kranenburg (DE);
Tuchwat Schagidow, Geldern (DE)

(73) Assignee: KHS GmbH, Dortmund (DE)

( * ) Notice: Subject to any disclaimer, the term of this patent is extended or adjusted under 35 U.S.C. 154(b) by 7 days.

(21) Appl. No.: 13/000,300

(22) PCT Filed: Jul. 14, 2009

(86) PCT No.: PCT/EP2009/005094
§ 371 (c)(1),
(2), (4) Date: Dec. 20, 2010

(87) PCT Pub. No.: WO2010/022820
PCT Pub. Date: Mar. 4, 2010

(65) Prior Publication Data
US 2011/0094853 A1    Apr. 28, 2011

(30) Foreign Application Priority Data
Aug. 28, 2008  (DE) ............. 20 2008 011 454 U

(51) Int. Cl.
*B65G 47/26* (2006.01)
(52) U.S. Cl. ................... 198/419.3; 198/419.2
(58) Field of Classification Search ............ 198/419.2, 198/419.3
See application file for complete search history.

(56) References Cited

U.S. PATENT DOCUMENTS

| 4,180,154 | A  | * | 12/1979 | Andersson | 198/419.3 |
| 5,141,219 | A  | * | 8/1992  | Watts et al. | 198/419.3 |
| 7,481,309 | B2 | * | 1/2009  | Wagner et al. | 198/419.3 |
| 8,011,495 | B2 | * | 9/2011  | Anderson et al. | 198/419.2 |

FOREIGN PATENT DOCUMENTS

| DE | 40 36 341 |   | 5/1992 |
| DE | 10 2004 042 474 |   | 3/2006 |
| DE | 10 2005 063 193 |   | 7/2007 |
| DE | 102006045453 | * | 4/2008 |
| EP | 403079 | * | 12/1990 |
| EP | 1329384 | * | 7/2002 |
| EP | 1382532 | * | 1/2004 |
| EP | 1522508 | * | 4/2005 |

* cited by examiner

*Primary Examiner* — James R Bidwell
(74) *Attorney, Agent, or Firm* — Occhiuti Rohlicek & Tsao LLP

(57) ABSTRACT

The invention relates to a device (1) for forming product groups from a flow of a plurality of identical piece goods fed by means of conveying devices, having an infeed track (16) and dividing elements engaging in the product flow in a synchronized manner transverse to the transport plane on at least one pair of driven, endlessly circulating flexible drive elements (7, 11, 12), wherein at least one crossbar (8) is disposed on each of said pairs of flexible drive elements, dividing elements (9) being held thereon, wherein at least three pairs of flexible drive elements (7, 11, 12) are provided within a device, wherein each of said pairs can be operated with a unique velocity profile.

6 Claims, 2 Drawing Sheets

DEVICE FOR SEPARATING PRODUCT GROUPS

CROSS-REFERENCE TO RELATED APPLICATIONS

This application is the National Stage of International Application No. PCT/EP2009/005094, filed on Jul. 14, 2009, which claims the benefit of German Application Ser. No. 20 2008 011 454.3 filed on Aug. 28, 2008. The contents of both of the foregoing applications are hereby incorporated by reference in their entirety.

FIELD OF INVENTION

The invention relates to a device for separating off product groups from a stream of a plurality of identical items supplied via conveying devices, said device including a supply path and dividing elements that engage in the product stream in a synchronized manner transversely relative to the conveying plane, wherein said dividing elements are held by a pair of driven, endlessly circulating, resilient drive elements, such as, for example, chains, toothed belts or the like.

BACKGROUND

Such a grouping device below a conveying section is shown, for example, in DE 40 36 341 A1, which provides contact elements that engage in the product stream from below, said contact elements being provided on endlessly circulating belt-like or chain-like drive elements. In this case, the distance between a pair of grouping elements corresponds to the size of the subsequent product group, as it is to be supplied to the packaging machines, i.e. one of the elements establishes the front region of the product group in the conveying direction, whilst the rear element engages in the subsequent bottles in order to prevent them from attempting to join in the further conveying of the first group. When the pulse for the further conveying is then activated once again, the group can be conveyed further correspondingly in a separated manner.

A similar development of grouping devices of this type is shown in DE 10 2004 042 474 A1, in this case a bar with dividing fingers being located on the one side of the conveyor belt below the conveying plane and a second bar with a second group of dividing fingers being located on the oppositely situated side, with a method of operation that corresponds, for instance, to the above-described method.

Another development of such a device, in particular concerning the detecting of the respective positioning, is provided by DE 10 2005 063 193 A1.

It has also been shown that the known solutions also have a certain limitation as concerns the variation in different sizes of product groups, for instance when the corresponding installations are converted to other product sizes. Currently, attempts are being made to make it possible to process a large number of different products on such installations. Thus, for example, it is desirable to be able to convert the processing of large-volume 2 liter plastic bottles to the processing of bottles with a volume of only 0.33 liters, such as, for example, is necessary when converting from soft drinks to mineral water.

In this connection, the distances between the dividing elements and their position has to be modifiable as quickly and problem-free as possible, effectively without disturbing the operation of such an installation through long shutdown times.

In addition, it is of considerable importance to be able to control the output of such a device, that is the number of separated product groups per unit time, in as flexible a manner as possible. There is currently no solution known in this connection.

The output of known devices for forming product groups, so-called separating devices, is currently dependent in a substantial manner on the conveyor belt speed and on the diameter of the containers to be processed.

On the one hand this is because the (maximum) speed of the conveyor belt is limited substantially through the characteristics of the containers, for example through their tendency to fall over, which means that the conveyor belt speed is a constant. If, for example, containers with large outer diameters are processed, a certain number of product groups has to be separated off when forming a certain product formation per unit time. If containers with a smaller diameter are then processed, a considerably larger number of product groups has to be separated off to form an identical product formation, as a considerably larger amount of containers per unit time is conveyed through the separating device.

However, as the separating elements necessary for separating the product groups have to move at the conveyor belt speed in a forcible manner at least over part of their path, the speed of the cross-struts in the case of devices from the prior art cannot be increased, which results in the output of such a device being substantially unmodifiable.

The prior art does not contain a proposal to solve this problem.

SUMMARY

It is the object of the present invention to provide a separating device, which, on the one hand, is adaptable in as flexible a manner as possible to containers with the most varied outer diameters, and which, on the other hand, is also modifiable in respect of its output.

With the invention it is possible to modify a separating device both with regard to the diameter of the container to be processed and with regard to the output. To this end, it is provided that at least three pairs of resilient drive elements or the like are provided with corresponding dividing elements, it being possible to operate each of said pairs independently of the at least two other pairs at its own speed profile.

In a preferred embodiment of the present invention it is provided that each of said pairs is provided with its own drive motor, preferably being a controllable and/or regulatable servo motor, which makes it possible, for example, to control and/or regulate its output speed and/or its output torque also within a 360° revolution of its drive shaft corresponding to the desired parameters.

Within the framework of the present application, the phrase speed profile of the resilient drive elements refers to the speed and/or the speed changes of a resilient drive element during a 360° revolution. In this case, said speed profile can have an arbitrary number of acceleration or deceleration phases, portions at constant speed, standstill phases, etc, which in total and in their sequence produce a movement sequence that meets the requirements for the separating device.

It may be remarked at this point that when "chain pairs" are referred to below, all corresponding circulating driving elements are meant, i.e. equally belt pairs, toothed belt pairs and corresponding elements.

The invention is not only limited to three drive shafts for three chain pairs, but is also aimed at a plurality of drive shafts and chain pairs in order to form a large belt width of the most varied item groups, e.g. beverage bottles, beverage cans or the like, at a high, adaptable output, said item groups then being supplied to packing machines which then pack said units in a corresponding manner and place them in boxes or on palettes, to mentioned but a few examples.

Developments of the invention are produced from the sub claims. In this case, it can be provided, for example, that the shafts that support the guiding toothed wheels for the chains are realized as drive shafts for one chain pair and as chain wheel bearing shafts for the other chain pairs.

If, for example, three drive shafts are provided, as a rule, the end-face shafts in each case that support the guiding toothed wheels each form the drive shaft for one chain pair and the third drive shaft acts upon the third chain pair. In order to obtain corresponding synchronization, it can be provided that the third and/or further drive shaft for the third and/or further chain pair is connected by means of an operative connection, such as chain slings, toothed belts or the like, to the drive chain wheel of the third or fourth chain pair on the respective bearing shaft.

In an expedient manner, the dividing elements are located on each crossbeam mounted on a chain pair. This means that, for example, the crossbeams always have a double-sided bearing arrangement, i.e. are statically determined, which is not necessarily the case for a one-sided mounted beam solution in the prior art.

The invention provides, as already represented, each drive motor with its own speed profile that is independent of the other drive motors, the independent stopping and/or modifying of said speed profile also being provided.

Preferably but not compulsorily, the individual speed profiles or their stopping is predetermined and monitored by a control means that is common to the drive motors.

BRIEF DESCRIPTION OF THE FIGURES

The invention is represented below in an exemplary embodiment, in which, in detail.

DETAILED DESCRIPTION

Figure 1:
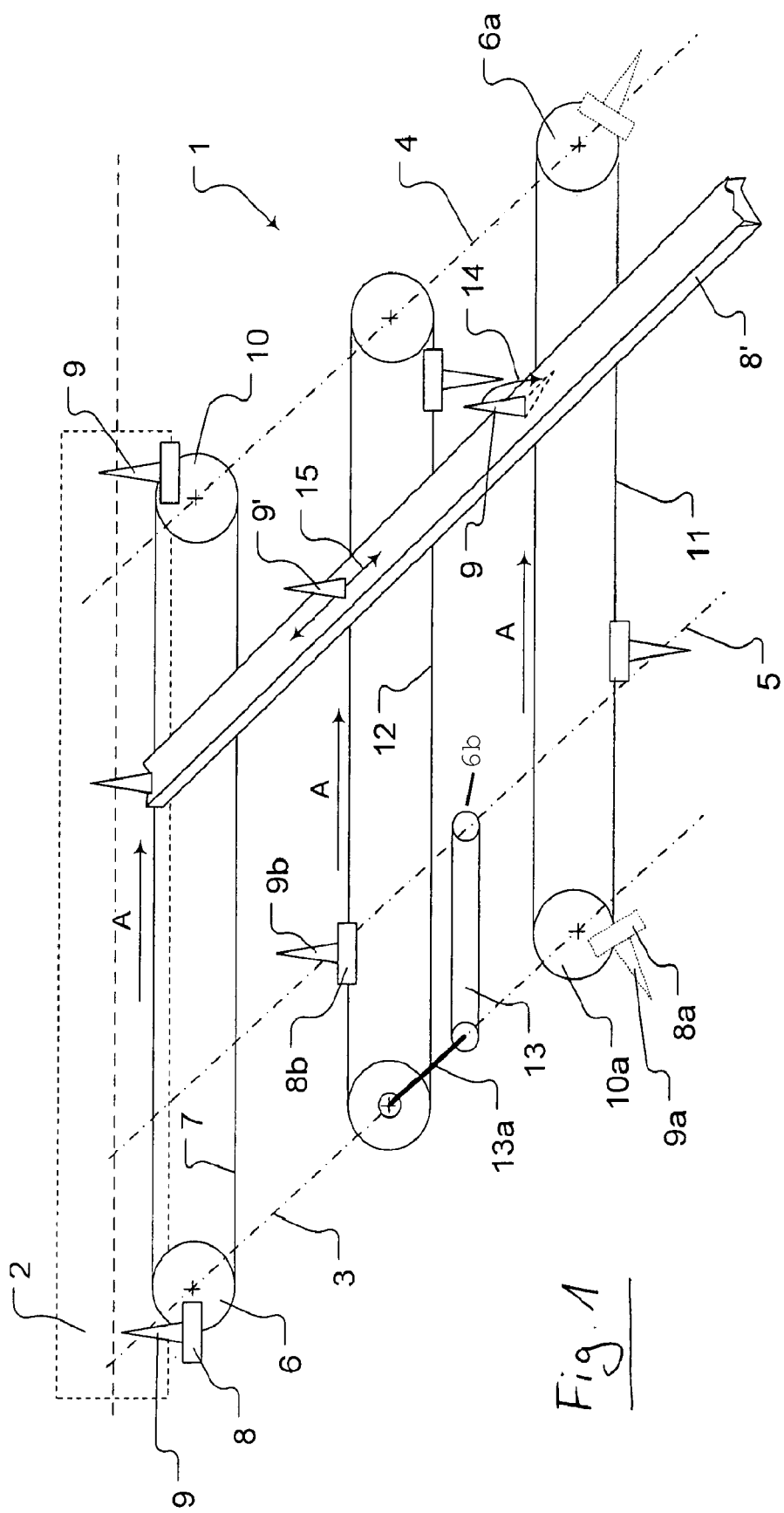
FIG. 1 shows a basic representation of a device according to the invention.

The schematic representation of the device according to the invention, identified by the general reference 1, only shows a side portion of the device frame 2, in which three shafts are mounted, namely an end-face shaft 3 on the left-hand side of the Figure in FIG. 1, an end-face shaft 4 positioned at the other end of the device and a shaft, identified by the reference 5, positioned in between, which serve in each case for the driving of one chain pair, FIG. 1 only representing in each case only one endless chain each for each chain pair.

Each of the shafts provided has associated therewith an independent drive motor, each of said drive motors being actuated by the at least one control means in such a manner that said drive motor can shut down the speed profile provided for it independently of the additional drive motors.

Without showing the motor-driven drives, e.g. servo motors here, a chain drive wheel 6 of the first chain, given the reference 7, of a chain pair is driven, for example, by means of the shaft 3, said chain pair being provided with crossbeams 8 that are arranged over the entire width of the device 1, with the indicated dividing elements 9.

The shaft 4 supports a planetary wheel, given the reference 10, for the circulating chain 7. At the same time, the shaft 4, by means of a motor (not shown), serves for the drive of a chain wheel, given the reference 6a, for an additional chain pair, of which only chain 11 is shown, the guide wheel of which, given the reference 10a, being mounted on the shaft 3.

The chain 11 also supports crossbeams 8a with dividing elements 9a.

A drive chain wheel 6b for a third chain 12 is driven by means of a drive shaft 5, which is also mounted in the device frame 2, an operative connection, e.g. a chain sling 13 being provided for this purpose. Said third chain 12 also supports crossbeams 8b with dividing elements. It can be seen that with this device according to the invention, a plurality of crossbeams 8, indicated in FIG. 1 and given the reference 8', can be positioned with, in their turn, a plurality of dividing elements 9 or 9' in order to be able to adapt the device to different units.

Of particular importance to the present invention is the speed profile of the individual pairs of resilient drive elements. For clarification, it is assumed below, as an example, that only one crossbeam 8 is located in each case on each pair of resilient drive elements.

At the beginning of a movement sequence, the crossbeam 8, or the dividing elements located on said crossbeam, is/are situated, for example, in a start position. Said start position is situated preferably below the conveyor belt plane such that products conducted by the conveyor belt can pass the start position without any problems.

If it is then indicated, for example by means of suitable sensors that the cut-off point between two product groups to be formed is approaching the position of engagement of the engagement elements, the crossbeam 8 is accelerated and at the same time, both with regard to its speed and with regard to its respective spatial position (path), is synchronized with the product group to be separated off.

If then the engagement elements, situated at said one crossbeam 8, are engaged in the products, the crossbeam 8 is moved for example at a speed that is somewhat slower than the speed of the conveyor belt in order to hold back the products to be separated off in relation to the conveyor belt, which finally leads to the forming of a gap to the product group situated ahead.

At a certain moment of its movement sequence, the crossbeam 8 travels onto a lower height level, the engagement elements thereby leaving the held-back product group and releasing it.

Once the engagement elements have completely left the product group, the crossbeam 8 is situated on the path to the start position, thus it is extremely advantageous if said return path is covered at an increased return speed.

If the crossbeam 8 is then situated in the start position once again or just in front of the same, it is extremely advantageous if it is moved at a reduced speed, or is even is at a standstill.

The additional pairs of resilient drive elements have at least similar speed profiles.

By selecting the parameters of the speed profiles in a clever manner, it is possible to separate off the most varied product groups in the most varied quantities per unit time. If, per unit time, only a smaller quantity of product groups per unit time is required, the return speed can be reduced and/or the waiting times increased.

Tests carried out on the premises of the applicant have shown that where the device has a small output, in many cases only one crossbeam is situated engaged in the product in each case at a moment in time.

If large quantities are required, the return speed must be increased and the waiting time reduced, which finally results, in two or more crossbeams 8 or engagement elements being engaged in the product at a moment in time.

Figure 2:
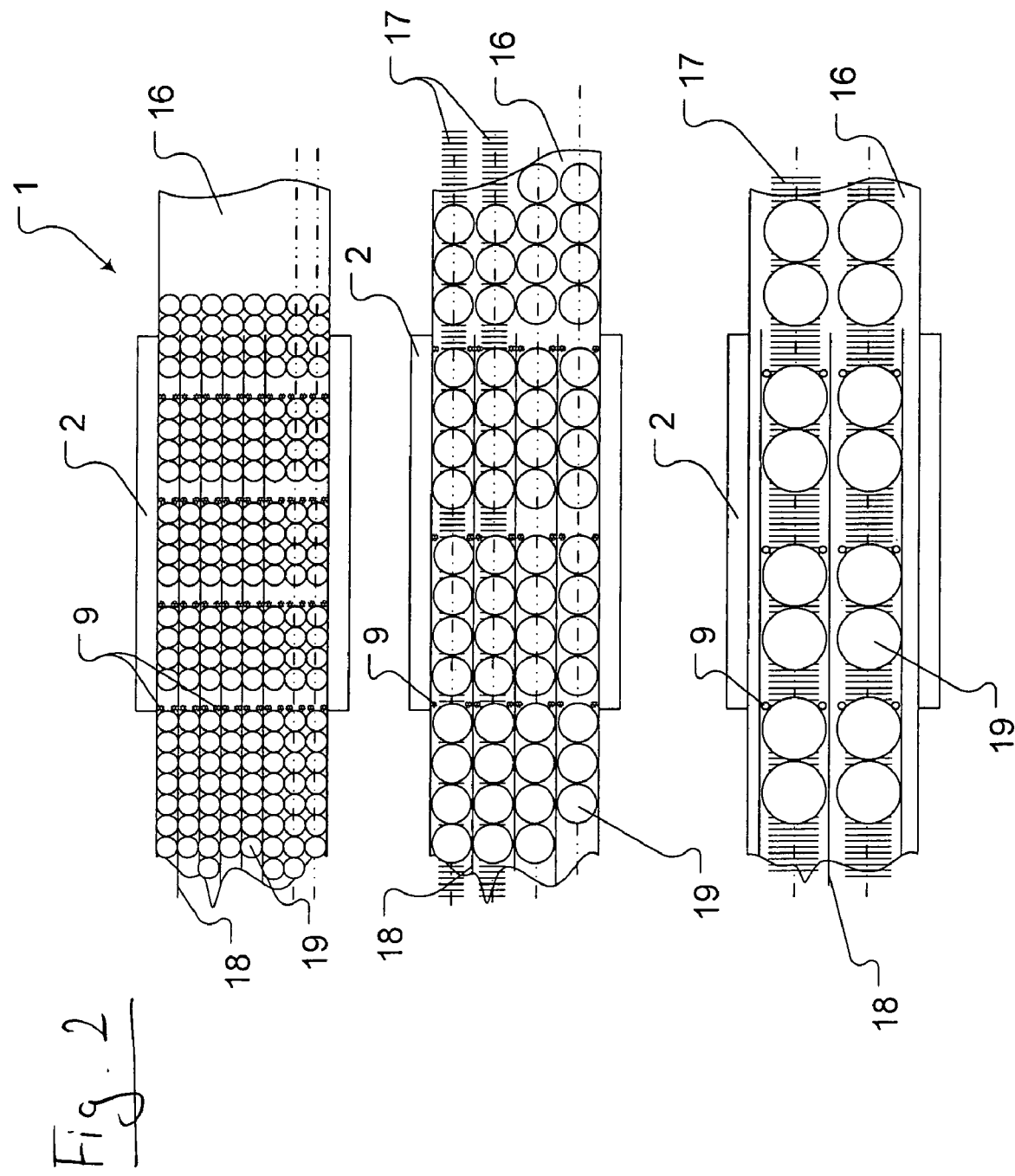
FIG. 2 shows a strongly simplified representation of different product groups that can be achieved with the device according to the invention.

Purely as an example, FIG. 2 shows different containers, which have been grouped together to form sets or packaging units and which have different diameters. Said containers 19 are situated on a conveying path, given the reference 16 and being formed by a multitude of individual conveyor belts 17. Partition walls 18 are located between the individual conveyor belts 17 such that the containers are conducted in boxes through the separating unit 1. In addition, it can be seen in FIG. 2 that to the side of the individual conveyor belts 17 the engagement elements 9 always engage a container 19 in pairs, which has not been represented in FIG. 1 for reasons of clarity.

The invention claimed is:

1. An apparatus for forming product groups from a product stream of a plurality of identical items supplied via conveying devices, said apparatus comprising:
   a supply path, and
   at least three pairs of driven, endlessly circulating, resilient drive elements, each of said pairs being operable at its own speed profile,
   dividing elements that engage the product stream in a synchronized manner transversely relative to a conveying plane on at least one of said pairs of driven, endlessly circulating, resilient drive elements, and
   at least one crossbeam, on which the dividing elements are held, said crossbeam being located on each of said pairs of resilient drive elements.

2. The apparatus of claim 1, further comprising a separate drive motor associated with each pair of resilient drive elements.

3. The apparatus of claim 2, wherein the drive motor comprises a servo motor.

4. The apparatus of claim 1, further comprising common control means for coordinating movement sequences of the pairs of resilient drive elements.

5. The apparatus of claim 1, further comprising additional crossbeams that selectively engage the product stream, wherein the number of crossbeams that engage the product stream at any one time is modifiable.

6. The apparatus of claim 5, further comprising control parameters that, when modified, cause modification of the number of crossbeams that engage the product stream at any one time.

* * * * *